(12) United States Patent
Liu et al.

(10) Patent No.: US 11,246,453 B2
(45) Date of Patent: Feb. 15, 2022

(54) FOOD PROCESSOR WITH OVERFLOW DETECTION RING

(71) Applicants: GUANGDONG MIDEA CONSUMER ELECTRICS MANUFACTURING CO., LTD., Foshan (CN); MIDEA GROUP CO., LTD., Foshan (CN)

(72) Inventors: Rong Liu, Foshan (CN); Jianfei Xu, Foshan (CN); Yan Tang, Foshan (CN)

(73) Assignees: GUANGDONG MIDEA CONSUMER ELECTRICS MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 231 days.

(21) Appl. No.: 16/467,055

(22) PCT Filed: Oct. 9, 2017

(86) PCT No.: PCT/CN2017/105424
§ 371 (c)(1),
(2) Date: Jun. 6, 2019

(87) PCT Pub. No.: WO2018/103445
PCT Pub. Date: Jun. 14, 2018

(65) Prior Publication Data
US 2020/0008625 A1   Jan. 9, 2020

(30) Foreign Application Priority Data

Dec. 6, 2016  (CN) .......................... 201621333705.6
Dec. 6, 2016  (CN) .......................... 201621333902.8

(Continued)

(51) Int. Cl.
*A47J 43/046* (2006.01)
*A47J 43/07* (2006.01)

(52) U.S. Cl.
CPC ......... *A47J 43/0761* (2013.01); *A47J 43/046* (2013.01)

(58) Field of Classification Search
CPC .. A47J 43/046; A47J 43/0727; A47J 43/0761; A47J 27/56
See application file for complete search history.

(56) References Cited

U.S. PATENT DOCUMENTS 3,627,008 A * 12/1971 Samuelian ............ A47J 43/046
                                                        241/199.12
7,185,837 B2 * 3/2007 Oliver ..................... A47J 42/40
                                                        241/282.1

(Continued)

FOREIGN PATENT DOCUMENTS

CN    101991373 A    3/2011
CN    203609270 U    5/2014

(Continued)

*Primary Examiner* — Faye Francis
(74) *Attorney, Agent, or Firm* — Kilpatrick Townsend & Stockton, LLP

(57) ABSTRACT

Embodiment provides a food processor with overflow detection ring. The overflow detection ring includes an annular body, a detecting portion connected to an inner edge of the annular body and extending along one side of the annular body, and a lead connecting structure connected to an outer edge of the annular body. The annular body, the detecting portion, and the lead connecting structure are in electrically conduction with one another.

12 Claims, 5 Drawing Sheets

(30) Foreign Application Priority Data

Dec. 6, 2016 (CN) .......................... 201621334012.9
Dec. 6, 2016 (CN) .......................... 201621334044.9
Dec. 6, 2016 (CN) .......................... 201621334177.6
Dec. 6, 2016 (CN) .......................... 201621334241.0

(56) References Cited

U.S. PATENT DOCUMENTS

| | | | | |
|---|---|---|---|---|
| 8,028,617 | B2 * | 10/2011 | Wang | .................... A47J 43/044 |
| | | | | 99/357 |
| 9,101,248 | B2 * | 8/2015 | Fevre | ...................... B02C 18/12 |
| 10,786,118 | B2 * | 9/2020 | Zeng | .................. A47J 43/0761 |
| 2009/0108000 | A1 * | 4/2009 | Lee | ......................... A47J 36/06 |
| | | | | 220/367.1 |
| 2019/0174959 | A1 * | 6/2019 | Zeng | .................. A47J 43/0761 |

FOREIGN PATENT DOCUMENTS

| | | |
|---|---|---|
| CN | 205144385 U | 4/2016 |
| CN | 205612288 U | 10/2016 |
| JP | 2005102666 A | 4/2005 |

\* cited by examiner

FOOD PROCESSOR WITH OVERFLOW DETECTION RING

PRIORITY CLAIM AND RELATED APPLICATION

The present disclosure is a national phase application of International Application No. PCT/CN2017/105424, filed on Oct. 9, 2017, which claims the priority of Chinese Application No. 201621334044.9, filed in the Chinese Patent Office on Dec. 6, 2016, and claims the priority of Chinese Application No. 201621334241.0, filed in the Chinese Patent Office on Dec. 6, 2016, and claims the priority of Chinese Application No. 201621334177.6, filed in the Chinese Patent Office on Dec. 6, 2016, and claims the priority of Chinese Application No. 201621334012.9 filed in the Chinese Patent Office on Dec. 6, 2016, and claims the priority of Chinese Application No. 201621333902.8 filed in the Chinese Patent Office on Dec. 6, 2016, and claims the priority of Chinese Application No. 201621333705.6 filed in the Chinese Patent Office on Dec. 6, 2016, the entireties of which are herein incorporated by reference.

FIELD

The present disclosure relates to the field of household electrical appliances, and more particularly relates to an overflow prevention ring and a food processor having the overflow prevention ring.

BACKGROUND

Most of the existing electric food processing apparatus (such as food processors) are not provided with an overflow prevention structure. Even if the food processor with the overflow prevention structure is provided, the position of the overflow prevention structure on the food processor is unreasonable, the mounting structure is complicated, and the mounting process is inconvenient, make it impossible to accurately detect whether the food materials in the blending cup overflow during the food materials being stirred, so that the food materials may overflow.

SUMMARY

The main purpose of the present disclosure is to provide an overflow prevention ring, which is intended to simplify the overflow prevention detection structure of a food processor, and accurately detect whether food materials in the food processor overflow in the process of stirring the food materials.

In order to achieve the above purpose, the overflow prevention ring provided in the present disclosure includes an annular body, a detecting portion connected to an inner edge of the annular body and extending along one side of the annular body, and a lead connecting structure connected to an outer edge of the annular body. The annular body, the detecting portion, and the lead connecting structure are in electrically conduction with each one another.

In one embodiment, an outer diameter of the annular body is at least 50 mm, and at most 80 mm.

In one embodiment, an inner diameter of the annular body is at least 55 mm, and at most 65 mm.

In one embodiment, a horizontal projection area of the annular body is at least 1300 mm$^2$, and at most 2000 mm$^2$.

In one embodiment, a thickness of the annular body is at least 0.5 mm, and at most 3 mm.

In one embodiment, an angle formed between a side wall of the detecting portion and the annular body is at least 60 degrees, and at most 120 degrees.

In one embodiment, a height of the detecting portion is at least 1 mm, and at most 25 mm.

In one embodiment, the detecting portion is a barrel fixedly connected to the inner edge of the annular body.

In one embodiment, the lead connecting structure includes a protruding rib connected to the outer edge of the annular body, and an end of the protruding rib away from the annular body defines a threading hole.

In one embodiment, the annular body, the detecting portion, and the protruding rib are all made of metal material, and the three are in an integrated structure.

The present disclosure further provides a food processor including a blending cup assembly. The blending cup assembly includes a blending cup and a cup lid assembly covering a cup opening of the blending cup. The cup lid assembly includes a lower lid covering the cup opening of the blending cup, the lower lid defines a feeding port in communication with an inner cavity of the blending cup, and the blending cup assembly further includes an overflow prevention ring mounted at a peripheral edge of the feeding port.

In one embodiment, the lower lid concavely defines a mounting slot in communication with the feeding port at the peripheral edge of the feeding port, and the overflow prevention ring includes an annular body embedded in the mounting slot.

In one embodiment, a thickness of the annular body is at least 0.5 mm, and at most 3 mm, and a depth of the mounting slot matches the thickness of the annular body.

In one embodiment, a ratio of a diameter of the lower lid to an outer diameter of the annular body is at least 1.1, and at most 3.5.

In one embodiment, the diameter of the lower lid is at least 90 mm, and at most 180 mm, and the outer diameter of the annular body is at least 55 mm, and at most 80 mm.

In one embodiment, a horizontal projection area of the annular body is at least 1300 mm$^2$, and at most 2000 mm$^2$.

In one embodiment, the overflow prevention ring further includes a detecting portion connected to an inner edge of the annular body and extending along one side of the annular body, and the detecting portion abuts an inner wall of the feeding port.

In one embodiment, an angle formed between a side wall of the detecting portion and the annular body is at least 60 degrees, and at most 120 degrees.

In one embodiment, a height of the detecting portion is at least 1 mm, and at most 25 mm.

In one embodiment, the detecting portion is a barrel fixedly connected to the inner edge of the annular body.

In one embodiment, the overflow prevention ring further includes a lead connecting structure connected to an outer edge of the annular body. The lower lid further concavely defines a fixing slot in communication with the mounting slot at the peripheral edge of the feeding port, and the lead connecting structure is embedded in the fixing slot.

In one embodiment, the lead connecting structure includes a protruding rib connected to the outer edge of the annular body, and an end of the protruding rib away from the annular body defines a threading hole.

In one embodiment, the blending cup includes a cup body and a handle connected to the cup body. The bottom of the blending cup defines a signal linking probe. A side wall of the cup body and/or the handle defines a signal conductor.

One end of the signal conductor is connected with the lead connecting structure, and the other end is connected with the signal linking probe.

In the present disclosure, the overflow prevention ring is configured as the annular body, and the inner edge of the annular body is connected to the detecting portion. By configuring the overflow prevention ring in an annular shape, the overflow prevention ring may well be easily to be mounted at the feeding port of the lower lid. Further, by configuring the detecting portion at the inner edge of the annular body, the overflow prevention ring is allowed to be combined with the cup opening of the food processor, and meanwhile, facilitating the overflow prevention detection of the food processor, so that the overflow prevention detection effect is improved.

BRIEF DESCRIPTION OF THE DRAWINGS

In order to more clearly illustrate the embodiments of the present disclosure, the drawings to be used in the description of the embodiments will be briefly described below.

DESCRIPTION OF THE DRAWING REFERENCE NUMBERS

Figure 1:
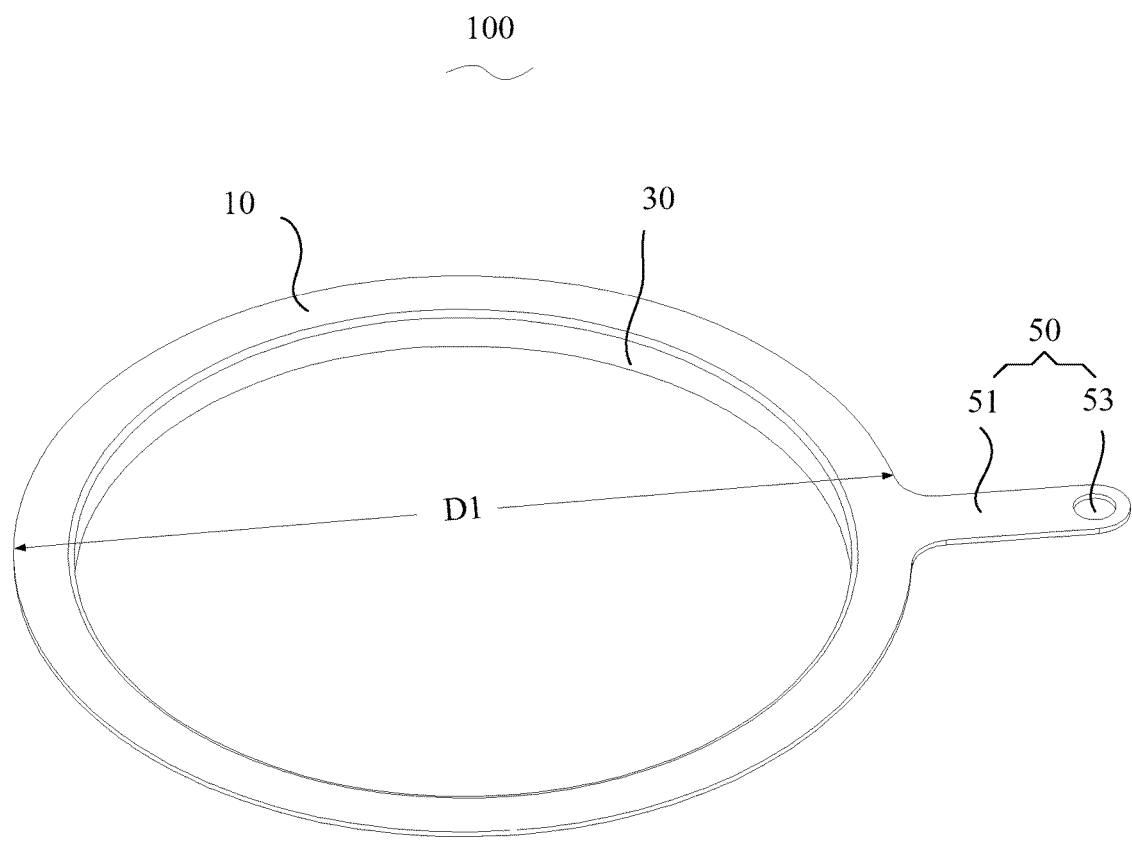
FIG. 1 is a perspective view of an overflow prevention ring according to a first embodiment of the present disclosure.

| Reference number | Name |
| --- | --- |
| 100 | Overflow prevention ring |
| 10 | Annular body |
| 30 | Detecting portion |
| 31 | Connecting plate |
| 33 | Connecting ring |
| 50 | Lead connecting structure |
| 51 | Protruding rib |
| 53 | Threading hole |
| 200 | Blending cup assembly |
| 2022 | Cup body |
| 2024 | handle |
| 204 | Lower lid |
| 2042 | Feeding port |
| 2044 | Mounting slot |
| 2046 | Fixing slot |
| 206 | Upper lid |
| 208 | Signal conductor |
| 210 | Signal linking probe |
| 300 | Host |
| 500 | Food processor |

DETAILED DESCRIPTION

In the following, the embodiment of the present disclosure will be described clearly and completely with reference to the drawings in the embodiment of the present disclosure. In one embodiment, the described embodiments are only a part of the embodiments of the present disclosure, not all of the embodiments.

It should be noted that all directional indicators (such as upper, lower, left, right, front, rear, etc.) in the embodiment of the present disclosure are only used to explain the relative positional relationship, movement situation, etc. between various components under a certain specific posture (as shown in the drawings). If the specific posture changes, the directional indicator will also change accordingly.

In the present disclosure, the terms "connected" and "fixed" and the like shall be broadly understood unless explicitly specified and limited otherwise. In one embodiment, "fixed" may be a fixed connection, a detachable connection, or an integral part; it may be mechanical connection or electrical connection; it may be directly connected or indirectly connected through an intermediate medium, and it may be the communication between two elements or the interaction between two elements, unless otherwise explicitly defined.

In addition, the descriptions related to "first", "second" and the like in the present disclosure are for descriptive purposes only, and may not be understood as indicating or implying its relative importance or implicitly indicating the number of features indicated. Thus, features defining "first" and "second" may explicitly or implicitly include at least one of the features. In addition, the various embodiments may be combined with each other.

The present disclosure provides an overflow prevention ring.

Figure 2:
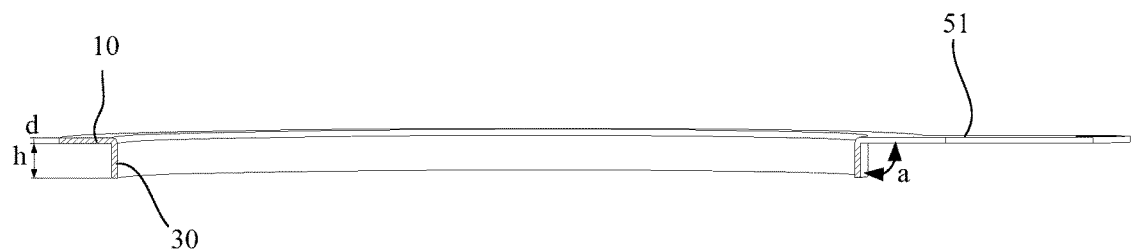
FIG. 2 is a section view of the overflow prevention ring in FIG. 1.

Referring to FIGS. 1 to 2, in one embodiment of the present disclosure, the overflow prevention ring 100 includes an annular body 10, a detecting portion 30 connected to an inner edge of the annular body 10 and extending toward one side of the annular body 10, and a lead connecting structure 50 connected to an outer edge of the annular body 10. The detecting portion 30, the annular body 10, and the lead connecting structure 50 are in electrically conduction. An outer diameter of the annular body 10 is at least 50 mm, and at most 80 mm.

In the present embodiment, the annular body 10, the detecting portion 30 and a protruding rib 51 are all made of metal material, and the three are in an integrated structure. The annular body 10, the detecting portion 30, and the protruding rib 51 are allowed to be made of stainless steel, and the three are allowed to be produced and processed by stamping. Certainly, the three are further allowed to be produced by die casting or welding. In case the overflow prevention ring 100 is mounted in a food processor 500, the annular body 10 is embedded in the peripheral edge of a cup opening or a feeding port of a blending cup assembly of the food processor 500, the detecting portion 30 extends into a cavity of the blending cup, and the lead connecting structure 50 is connected with a conductor configured to transmit signals. In the process of stirring food materials by the food processor, in case the food materials in the blending cup assembly touches the detecting portion 30 of the overflow prevention ring 100, the voltage of the detecting portion 30 is changed, thus generates a control signal transmitted to the main control board through the conductor connected with the lead connecting structure 50, and then the main control board sends an instruction, and the food processor stops stirring the food materials. It should be understood that the food processor mounted with the overflow prevention ring 100 further has an overflow prevention function in the process of heating the food materials. In the process of heating the food materials, in case foam generated in the blending cup assembly touches the detecting portion 30, the main control board of the food processor receives an overflow signal, and controls the heating device to stop heating according to the overflow signal to prevent the food materials in the blending cup assembly from overflowing.

In the present disclosure, the overflow prevention ring 100 is configured as the lead connecting structure 50 connected to the outer edge of the annular body 10, and a detecting portion 30 is connected to the inner edge of the annular body 10. The annular body 10, the detecting portion 30, and the lead connecting structure 50 are in electrically conduction. By configuring the overflow prevention ring 100 in an annular shape, the overflow prevention ring 100 is relatively easily to be mounted at the cup opening or the feeding port of the blending cup assembly. Meanwhile, the present disclosure further configures the outer diameter of the annular body 10 is at least 50 mm, and at most 80 mm, which ensures that the overflow prevention ring 100 is firm mounted on the blending cup assembly and allows the overflow prevention ring 100 and the blending cup assembly of the food processor being better combined together, while the opening size of the overflow prevention ring 100 may also be allowed to be reasonably configured to feed the food materials into the blending cup assembly during the operation of the food processor. In case the outer diameter of the annular body 10 of the overflow prevention ring is less than 50 mm, the opening diameter of the overflow prevention ring 100 is too small to facilitate feeding in the operation of the food processor. In case the outer diameter of the annular body 10 of the overflow prevention ring 100 is larger than 80 mm and the overflow prevention ring 100 has a suitable mounting area, the opening diameter of the overflow prevention ring 100 is too large, so that the food materials are not easily to contact with the overflow prevention ring 100 in the operation of the food processer, so that the detection accuracy of the food processor is reduced. The outer diameter of the annular body 10 of the overflow prevention ring 100 of the present disclosure is configured to be at least 50 mm, and at most 80 mm, so that the overflow prevention ring has a better detection width. In the process of stirring food of the food processor, the detecting portion 30 configured at the inner edge of the annular body 10 is allowed to accurately detect whether the food materials rush to the cup opening or the feeding port of the blending cup assembly during the stirring process, so that the overflow prevention ring 100 of the present disclosure is allowed to accurately detect whether the food materials overflow during the stirring process of the food processor.

In one embodiment, the outer diameter of the annular body 10 of the present embodiment is at least 65 mm, and at most 75 mm. In one embodiment, the outer diameter of the annular body 10 of the present embodiment is 74 mm. With this value, the optimal detection effect of the overflow prevention ring 100 is achieved.

Further, on the basis the annular body 10 having an outer diameter being at least 65 mm, and at most 75 mm, an inner diameter of the annular body 10 is at least 55 mm, and at most 65 mm. In addition, in case the outer diameter of the annular body 10 is 74 mm, the inner diameter of the annular body 10 can be 64 mm. Within this numerical range, the optimal detection effect of the overflow prevention ring 100 is achieved.

Further, on the basis the annular body 10 having the above-mentioned outer diameter range, a horizontal projection area of the annular body 10 of the present disclosure is at least 1300 mm$^2$, and at most 2000 mm$^2$.

In the present disclosure, the horizontal projection area of the annular body 10 is further configured to be at least 1300 mm$^2$, and at most 2000 mm$^2$. Within this numerical range of the area, the annular body 10 and the blending cup assembly have a more appropriate contact area, making the connection between the annular body 10 and the blending cup assembly be much more firm, no matter the annular body 10 is connected with the blending cup assembly by gluing or embedding. During use, even though the food processor shakes, the overflow prevention ring 100 can still be tight enough with the blending cup assembly. The overflow prevention ring and the blending cup assembly of the food processor in the present disclosure are allowed to be better combined together.

In case the horizontal projection area of the annular body is less than 1300 mm$^2$, namely the combined area of the overflow prevention ring 100 and the blending cup assembly is small, the connection between the two would be affected. While, in case the horizontal projection area of the annular body is greater than 2000 mm$^2$, then the blending cup assembly needs reserving much more mounting space for the overflow prevention ring, which is not beneficial to the structural design of the blending cup assembly, and may also reduce the structural strength of the blending cup assembly. Further, the material cost of the overflow prevention ring 100 would be increased.

In the present disclosure, the horizontal projection area of the annular body 10 is configured to be at least 1300 mm$^2$, and at most 2000 mm$^2$, so that providing the overflow prevention ring 100 an appropriate detection area. In the food stirring process of the food processor, the detecting portion 30 configured at the inner edge of the annular body 10 is allowed to accurately detect whether the food materials rush to the cup opening or the feeding port of the blending cup assembly. So, the overflow prevention ring 100 of the present disclosure can accurately detect whether the food materials overflow during the food stirring process.

Further, the horizontal projection area of the annular body 10 of the present embodiment is at least 1400 mm$^2$, and at most 1800 mm$^2$. With this value, the optimal detection effect of the overflow prevention ring 100 is achieved.

The detecting portion 30 of the overflow prevention ring 100 of the present disclosure is allowed to have various structures, and an angle formed between the side wall of the detecting portion 30 and the annular body 10 is at least 60 degrees, and at most 120 degrees.

Referring to FIG. 2, in one embodiment, the detecting portion 30 is a barrel fixedly connected to the inner edge of the annular body 10. The barrel of the present embodiment is allowed to be a straight barrel structure with the side wall of the barrel being configured at right angles to the annular body 10. The detecting portion 30 is configured as a barrel, which allows the food material rushing to the cup opening or the feeding port being easily contacted by the detecting portion 30 to generate overflow signals, thus the detection for overflow is more sensitive. It should be understood that, the detecting portion 30 is a barrel structure, the inner diameter of the barrel is allowed to be gradually enlarged or reduced from one end close to the annular body 10 to the other end away from the annular body 10, making the detecting portion 30 be an open or necked shape. Thus, during the overflow prevention ring 100 performing overflow prevention detection and the detecting portion 30 conducting electric detection via the voltage change, the side wall of the detecting portion 30 can also assist to prevent the food materials from overflow, namely, to reduce the overflow of the food materials in the blending cup assembly at the cup opening or the feeding port. A height of the detecting portion 30 is at least 1 mm, and at most 25 mm. The optimal detection effect can be achieved with the above-mentioned numerical settings of the detecting portion 30.

Figure 3:
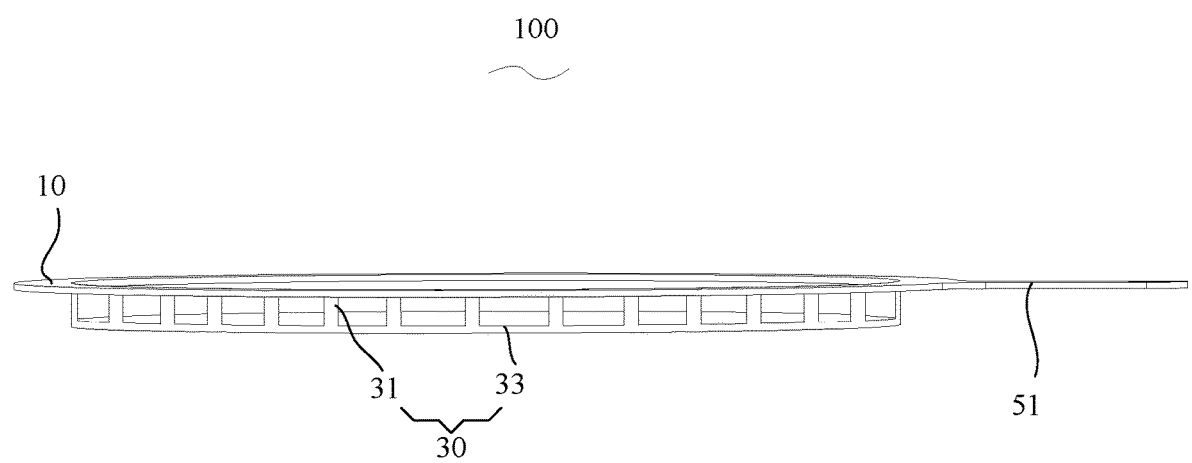
FIG. 3 is a perspective view of an overflow prevention ring according to a second embodiment of the present disclosure.

Referring to FIG. 3, in one embodiment, the detecting portion 30 includes connecting plates 31 fixedly connected to the inner edge of the annular body 10, and a connecting ring 33 connected to the ends of connecting plates 31. The connecting plate 31 is configured at right angles to the annular body 10 as well. The detecting portion 30 that is formed by the connecting plate 31 and the connecting ring 33 has a hollow shape, thus materials are saved while high detection accuracy of the detecting portion 30 can also be ensured.

In the present disclosure, the lead connecting structure 50 includes a protruding rib 51 connected to the outer edge of the annular body 10, and an end of the protruding rib 51 away from the annular body 10 defines a lead fixing structure. The plane of the protruding rib 51 located coincides with the plane of the annular body 10 located. In the present disclosure, an assembly space is reserved for the connection between the conductor configured to transmit signals and the overflow prevention ring 100 through the configuration of the protruding rib 51 of the overflow prevention ring 100, so that the overflow prevention ring 100 can be easily mounted. Meanwhile, the protruding rib 51 and the annular body 10 are arranged on the same plane, so that the overflow prevention ring 100 is allowed to be embedded in the side wall of a cup body of the blending cup assembly more easily, the overflow prevention ring 100 is not prone to be touched and loosen, and the appearance of the blending cup assembly may also be attractive after the mounting of the overflow prevention ring 100. In one embodiment of the present disclosure, the lead fixing structure is a threading hole 53 defined at the protruding rib 51. During mounting of the overflow prevention ring 100, lead first passes through the threading hole 53 and then conductor is welded to get a firm connection.

Figure 4:
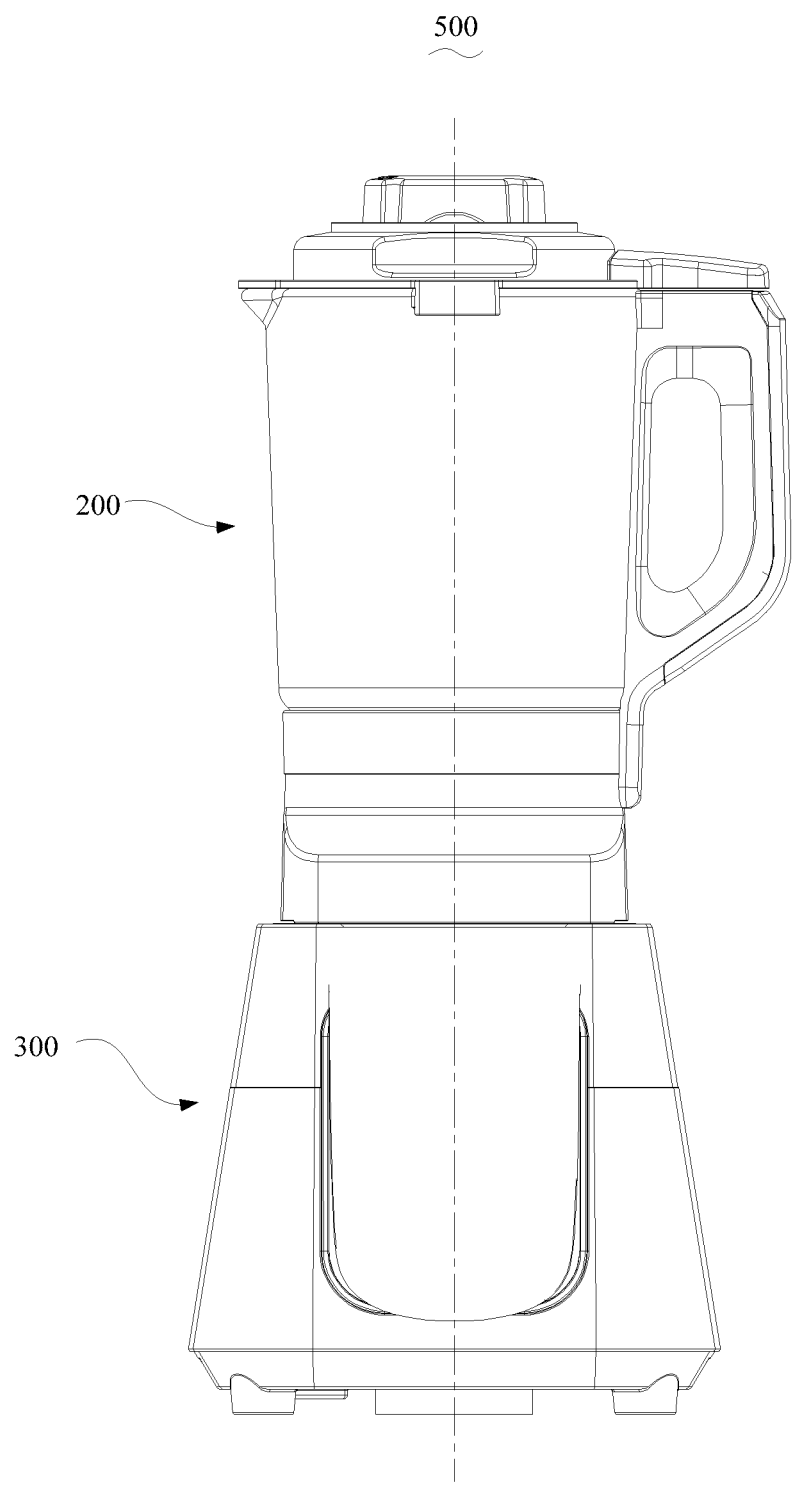
FIG. 4 is a front view of a food processor according to the present disclosure.
Figure 5:
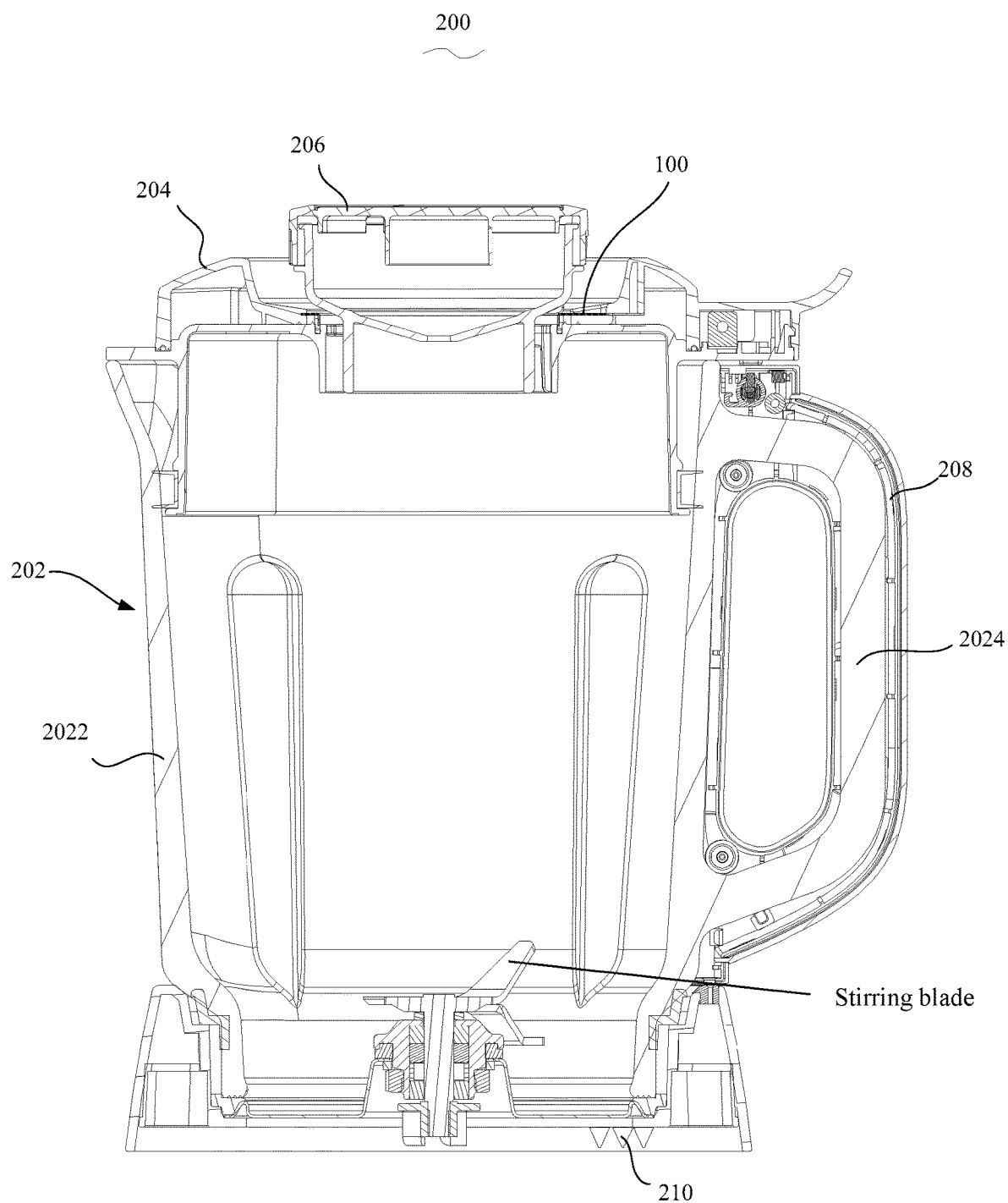
FIG. 5 is a section view of a blending cup assembly of the food processor according to the present disclosure.
Figure 6:
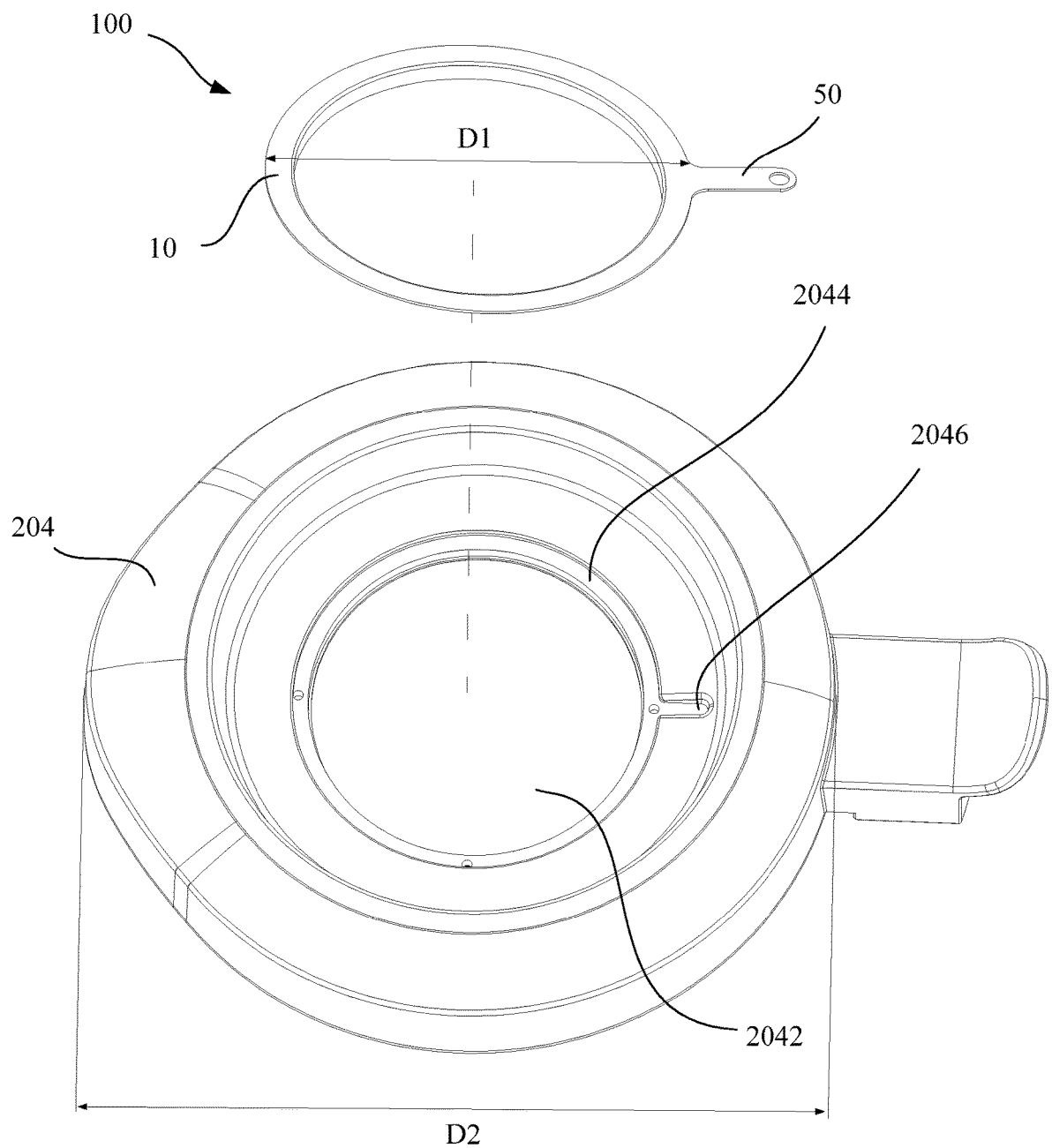
FIG. 6 is a exploded view of a lower lid of the blending cup assembly in FIG. 5 and the overflow prevention ring.

Referring to FIGS. 4 to 6, the present disclosure further provides a food processor 500 including a blending cup assembly 200, and the blending cup assembly 200 includes a blending cup 202 and a cup lid assembly covering a cup opening of the blending cup 202. The cup lid assembly includes a lower lid 204 covering the cup opening of the blending cup 202, and the lower lid 204 defines a feeding port 2042 in communication with an inner cavity of the blending cup 202. The blending cup assembly 200 further includes an overflow prevention ring 100 mounted at the peripheral edge of the feeding port 2042.

The cup lid assembly of the present embodiment further includes an upper lid 206 in cover connection with the lower lid 204, and the upper cover 206 partially extends into the feeding port 2042. The blending cup assembly 200 further includes a stirring blade assembly (not shown) partially extending into the blending cup 202. During the food processor 500 in use, the stirring blade assembly rotates at a high speed under the drive of the motor of the host to stir the food materials in the blending cup 202. The food materials in the blending cup 202 is allowed to be added through the cup opening of the blending cup 202 before the food processor being started and the cup lid assembly covers the blending cup 202. If the food materials need to be added continuously in the process of the food processor stirring the food materials, the upper lid 206 is allowed to be opened, and the food materials can be continuously added through the feeding port 2042. The overflow prevention ring 100 is mounted on the lower lid 204 and located at the peripheral edge of the feeding port 2042.

In the present disclosure, the overflow prevention ring 100 is defined at the peripheral edge of the feeding port 2042 of the lower lid 204 of the cup lid assembly, in case the food materials in the blending cup 202 rush to the feeding port 2042 in the process of stirring the food materials by the food processor, overflow signals are generated as long as the food materials touch the overflow prevention ring 100, according to which the food processor is allowed to make corresponding actions to prevent the food materials in the blending cup assembly 200 from overflowing. The process of assembling the overflow prevention ring 100 to the lower lid 204 is relatively simple by defining the overflow prevention ring 100 at the peripheral edge of the feeding port 2042 of the lower lid 204 without additionally arranging a structure inside the cup lid assembly for mounting the overflow prevention ring 100. Further, the overflow prevention ring 100 is allowed to accurately detect whether the food materials rush to the cup opening or the feeding port 2042 of the blending cup assembly 200 during the stirring process, thus an accurate detection is achieved.

Further, the lower lid 204 concavely defines a mounting slot 2044 in communication with the feeding port 2042 at the peripheral edge of the feeding port 2042, and the overflow prevention ring 100 is at least partially embedded in the mounting slot 2044. The overflow prevention ring 100 is convenient to be assembled and disassembled by defining the mounting slot 2044 in the lower lid 204 for the overflow prevention ring 100 being embedded in, and an additional mounting structure would no longer be needed to be arranged inside the cup lid assembly for the overflow prevention ring 100 to be mounted.

Referring to FIGS. 5 and 6, the overflow prevention ring 100 includes the annular body 10, the detecting portion 30 connected to the inner edge of the annular body 10, and the lead connecting structure 50 connected to the outer edge of the annular body 10. The annular body 10 is embedded in the mounting slot 2044, and the detecting portion 30 abuts the inner wall of the feeding port 2042 and extends to one side of the blending cup 202 to be embedded into the inner cavity of the blending cup 202. The upper lid 206 concavely defines a fixing slot 2046 in communication with the mounting slot 2044 at the peripheral edge of the feeding port 2042. The lead connecting structure 50 is embedded in the fixing slot 2046. The lead connecting structure 50 includes the protruding rib 51 embedded in the fixing slot 2046, the protruding rib 51 is connected to the outer edge of the annular body 10, and the end of the protruding rib 51 away from the annular body 10 defines the threading hole 53. The blending cup includes the cup body 2022 and a handle 2024 connected to the cup body 2022. The bottom of the blending cup 202 defines a signal linking probe 210. The side wall of the cup body 2022 and/or the handle 2024 defines a signal conductor 208, one end of the signal conductor 208 is connected with the lead connecting structure 50, and the other end is connected with the signal linking probe 210. Thus, a complete overflow prevention signal transmission link is formed in the blending cup assembly. During the food processor in use, the combination of the overflow prevention ring 100, the signal conductor 208 and the signal linking probe 210 will not affect the normal operation of the food processor 500, the overflow prevention ring 100 is allowed to accurately detect whether the food materials rush to the cup opening or the feeding port 2042 of the blending cup assembly 200 during the stirring process, and the overflow prevention ring 100 is allowed to stably transmit the overflow prevention signal to the host of the food processor, thus an accurate detection is achieved.

The detecting portion 30 extends to one side of the blending cup 202 by a distance being at least 1 mm, and at most 25 mm. According to this arrangement, the food materials are easily to touch the detecting portion 30 in case the food materials rush to the feeding port 2042, thus the detection for overflow prevention of the blending cup assembly 200 of the present disclosure is more sensitive and accurate.

In the present embodiment, the wall thickness of the annular body 10 is at least 0.5 mm, and at most 3 mm, and the depth of the mounting slot 2044 matches the wall thickness of the annular body 10. The connection between the overflow prevention ring 100 and the lower lid 204 in the present embodiment is allowed to be realized by gluing. The annular body 10 is flush with the surface of the lower lid 204 having the feeding port 2042 after the annular body 10 being embedded in the mounting slot 2044, thus the overflow prevention ring 100 will not protrude from the lower lid 204. During the food processor in use, the overflow prevention ring 100 can still be tight with the lower lid 204 even scraping happens, and the overall structure may also be attractive.

The detecting portion 30 of the overflow prevention ring 100 of the present disclosure is allowed to have various structural, and the detecting portion 30 is a barrel fixedly connected to the inner edge of the annular body 10. The barrel of the present embodiment is allowed to be a straight barrel structure with the side wall of the barrel being configured at right angles to the annular body 10. The detecting portion 30 is configured as a barrel, which allows the food materials rushing to the cup opening or the feeding port 2042 being easily contacted by the detecting portion 30 to generate overflow signals, thus the detection for overflow is more sensitive. It should be understood that, the detecting portion 30 is a barrel structure, the inner diameter of the barrel is allowed to be gradually enlarged or reduced from one end close to the annular body 10 to the other end away from the annular body 10, making the detecting portion 30 be an open or necked shape. Thus, during the overflow prevention ring performing overflow prevention detection and the detecting portion 30 conducting electric detection via the voltage change, the side wall of the detecting portion 30 can also assist to prevent the food materials from overflow, namely, to reduce the overflow of the food materials in the blending cup assembly at the cup opening or the feeding port.

Further, the ratio of the outer diameter of the lower lid 204 to the outer diameter of the annular body 10 is at least 1.1, and at most 3.5.

In the present disclosure, the overflow prevention ring 100 is configured as the annular body 10, and the detecting portion 30 is connected to the inner edge of the annular body 10. The overflow prevention ring 100 is easily to be mounted at the feeding port 2042 of the lower lid 204 by configuring the overflow prevention ring 100 in an annular shape.

Meanwhile, in the present disclosure, the ratio of the outer diameter of the lower lid 204 to the outer diameter of the annular body is configured to be at least 1.1, and at most 3.5. Thus with the general outer diameter size of the existing blending cup assembly, the opening size of the feeding port 2042 defined in the lower lid 204 and matched with the overflow prevention ring 100 is allowed to be reasonably configured, which is beneficial to feed the food materials into the blending cup assembly during the food processor in use, so the overflow prevention ring 100 and the blending cup assembly 200 of the food processor are allowed to be better combined together.

In the present disclosure, the ratio of the outer diameter of the lower lid 204 and the outer diameter of the annular body 10 is configured to be at least 1.1, and at most 3.5, so that providing the overflow prevention ring 100 an appropriate detection range. In the process of stirring food by the food processor, the detecting portion 30 configured at the inner edge of the annular body 10 is allowed to accurately detect whether the food materials rush to the cup opening or the feeding port of the blending cup assembly. Thus the overflow prevention ring 100 of the present disclosure is allowed to accurately detect whether the food materials overflow in the process of stirring the food materials by the food processor.

In case the ratio of the outer diameter of the lower lid 204 to the outer diameter of the annular body 10 is smaller than 1.1, then the opening diameter of the feeding port 2042 of the blending cup assembly 200 will be too large. During the operation of the food processor 500, the food materials may come out of the blending cup assembly from the middle part of the feeding port, making the food materials be not easily to contact the overflow prevention ring 100, thus reduces the detection accuracy of the food processor 500. In case the ratio of the outer diameter of the lower lid 204 to the outer diameter of the annular body 10 is larger than 3.5, then the opening diameter of the feeding port 2042 of the blending cup assembly is too small to facilitate feeding during the food processor 500 in use.

Further, the diameter of the lower lid 204 is at least 90 mm, and at most 180 mm. The outer diameter of the annular body 10 is at least 55 mm, and at most 80 mm. The diameter of the lower lid 204 is at least 130 mm, and at most 160 mm, and 150 mm is in one embodiment. The outer diameter of the annular body 10 is at least 60 mm, and at most 80 mm, and 74 mm is in one embodiment. Thus, the blending cup assembly 200 has better functional status, better feeding and detection effects.

Further, the inner diameter of the annular body 10 is at least 50 mm, and at most 70 mm. The inner diameter of the annular body 10 can be further reduced to be at least 55 mm, and at most 65 mm. In case the outer diameter of the annular body 10 is 74 mm, the inner diameter of the annular body 10 is 64 mm. Within this numerical range, the optimal detection effect of the overflow prevention ring 100 is achieved.

Further, on the basis the annular body 10 having the above-mentioned outer diameter range, the horizontal projection area of the annular body 10 of the present disclosure is at least 1300 mm², and at most 2000 mm².

In the present disclosure, the horizontal projection area of the annular body 10 is further configured to be at least 1300 mm², and at most 2000 mm². Within this numerical range of the area, the annular body 10 and the blending cup assembly have a more appropriate contact area, making the connection between the annular body 10 and the blending cup assembly be much more firm, no matter the annular body 10 is connected with the blending cup assembly by gluing or embedding. During use, even though the food processor shakes, the overflow prevention ring 100 can still be tight enough with the blending cup assembly. The overflow prevention ring and the blending cup assembly 200 of the food processor 500 are allowed to be better combined together.

What is claimed is:

1. A food processor, comprising:
a blending cup assembly configured to process food, the blending cup assembly comprising:
a blending cup provided with a stirring blade, wherein the stirring blade is configured to blend the food; and
a cup lid assembly covering a cup opening of the blending cup, wherein the cup lid assembly comprises:
a lower lid covering the cup opening of the blending cup, the lower lid defining a feeding port in communication with an inner cavity of the blending cup, and the blending cup assembly further comprises:
an overflow detection ring mounted at a peripheral edge of the feeding port and configured to detect food overflow during food processing;
wherein the overflow detection ring further comprises a detecting portion connected to an inner edge of the annular body and extending downwards from the annular body, the detecting portion abutting an inner wall of the feeding port;
wherein the detecting portion is configured to generate an overflow signal when the food touches the overflow detection ring during food processing.

2. The food processor of claim 1, wherein the lower lid concavely defines a mounting slot in communication with the feeding port at the peripheral edge of the feeding port, the overflow detection ring comprising an annular body embedded in the mounting slot.

3. The food processor of claim 2, wherein a thickness of the annular body is at least 0.5 mm, and at most 3 mm, a depth of the mounting slot matching the thickness of the annular body.

4. The food processor of claim 2, wherein a ratio of a diameter of the lower lid to an outer diameter of the annular body is at least 1.1, and at most 3.5.

5. The food processor of claim 4, wherein the diameter of the lower lid is at least 90 mm, and at most 180 mm, the outer diameter of the annular body being at least 55 mm, and at most 80 mm.

6. The food processor of claim 5, wherein a horizontal projection area of the annular body is at least 1300 mm$^2$, and at most 2000 mm$^2$.

7. The food processor of claim 1, wherein an angle formed between a side wall of the detecting portion and the annular body is at least 60 degrees, and at most 120 degrees.

8. The food processor of claim 7, wherein the detecting portion is a barrel fixedly connected to the inner edge of the annular body.

9. The food processor of claim 1, wherein the overflow detection ring further comprises a lead connecting structure connected to an outer edge of the annular body, the lower lid further concavely defining a fixing slot in communication with the mounting slot at the peripheral edge of the feeding port, the lead connecting structure being embedded in the fixing slot;
wherein the annular body, the detecting portion, and the lead connecting structure are in electrically conductive with each other.

10. The food processor of claim 9, wherein the lead connecting structure comprises a protruding rib connected to the outer edge of the annular body, an end of the protruding rib away from the annular body defining a threading hole.

11. The food processor of claim 10, wherein the blending cup comprises a cup body and a handle connected to the cup body, the bottom of the blending cup defining a signal linking probe, a side wall of the cup body and/or the handle defining a signal conductor, one end of the signal conductor being connected with the lead connecting structure, the other end being connected with the signal linking probe.

12. The food processor of claim 1, wherein the detecting portion further comprises multiple connecting plates fixedly connected to inner edge of the annular body, and a connecting ring connected to lower ends of the multiple connecting plates.

* * * * *